United States Patent
Lei et al.

(10) Patent No.: US 12,096,450 B2
(45) Date of Patent: Sep. 17, 2024

(54) METHOD AND APPARATUS FOR RESOURCE ALLOCATION ON UNLICENSED SPECTRUM

(71) Applicant: LENOVO (BEIJING) LIMITED, Beijing (CN)

(72) Inventors: Haipeng Lei, Beijing (CN); Zhi Yan, Beijing (CN); Xiaodong Yu, Beijing (CN); Zhennian Sun, Beijing (CN); Robert T. Love, Barrington, IL (US)

(73) Assignee: Lenovo (Beijing) Limited, Beijing (CN)

( * ) Notice: Subject to any disclaimer, the term of this patent is extended or adjusted under 35 U.S.C. 154(b) by 410 days.

(21) Appl. No.: 17/441,193

(22) PCT Filed: Mar. 29, 2019

(86) PCT No.: PCT/CN2019/080503
§ 371 (c)(1),
(2) Date: Sep. 20, 2021

(87) PCT Pub. No.: WO2020/198965
PCT Pub. Date: Oct. 8, 2020

(65) Prior Publication Data
US 2022/0132475 A1    Apr. 28, 2022

(51) Int. Cl.
*H04W 72/23* (2023.01)
*H04L 5/00* (2006.01)
*H04W 72/0453* (2023.01)

(52) U.S. Cl.
CPC .......... *H04W 72/23* (2023.01); *H04L 5/0094* (2013.01); *H04W 72/0453* (2013.01)

(58) Field of Classification Search
CPC ............. H04W 72/23; H04W 72/0453; H04W 72/21; H04W 16/14; H04W 72/20; H04L 5/0094; H04L 5/0044; H04L 5/0007
See application file for complete search history.

(56) References Cited

U.S. PATENT DOCUMENTS

| 2019/0021045 A1 | 1/2019 | Kim et al. |
| 2019/0059112 A1* | 2/2019 | Ou ................... H04W 74/0833 |
| 2021/0058940 A1* | 2/2021 | Choi .................... H04L 5/0092 |

FOREIGN PATENT DOCUMENTS

| CN | 102893688 A | 1/2013 |
| CN | 106717091 A | 5/2017 |

(Continued)

OTHER PUBLICATIONS

International Searching Authority, "Written Opinion of the International Searching Authority," PCT/CN2019/080503, Dec. 26, 2019, pp. 1-5.

*Primary Examiner* — Thai Nguyen
(74) *Attorney, Agent, or Firm* — Kunzler Bean & Adamson

(57) ABSTRACT

The present application relates to method and apparatus for resource allocation on unlicensed spectrum. One embodiment of the present disclosure provides a method comprising: receiving a Downlink Control Information (DCI) assigning frequency resources of a carrier for transmitting data on the carrier, wherein the frequency resources include a first set of Physical Resource Blocks (PRBs) and a second set of PRBs and the frequency resources span over a predefined percentage of a bandwidth of the carrier, and the bandwidth of the carrier is greater than 20 MHz; and transmitting the data on the first set of PRBs and the second set of PRBs.

20 Claims, 24 Drawing Sheets

| RIV | Assigned interlace pattern |
|---|---|
| 55 | First half interlace 800, second half interlace 805 |
| 56 | Second half interlace 800, first half interlace 805 |
| 57 | First half interlace 801, second half interlace 806 |
| 58 | Second half interlace 801, first half interlace 806 |
| 59 | First half interlace 802, second half interlace 807 |
| 60 | Second half interlace 802, first half interlace 807 |
| 61 | First half interlace 803, second half interlace 808 |
| 62 | Second half interlace 803, first half interlace 808 |
| 63 | First half interlace 804, second half interlace 809 |

(56) References Cited

FOREIGN PATENT DOCUMENTS

CN 108934075 A 12/2018
WO WO-2018232284 A1 * 12/2018 .......... H04W 72/042

* cited by examiner

| RIV | Assigned interlace pattern |
|---|---|
| 55 | First half interlace 800, second half interlace 805 |
| 56 | Second half interlace 800, first half interlace 805 |
| 57 | First half interlace 801, second half interlace 806 |
| 58 | Second half interlace 801, first half interlace 806 |
| 59 | First half interlace 802, second half interlace 807 |
| 60 | Second half interlace 802, first half interlace 807 |
| 61 | First half interlace 803, second half interlace 808 |
| 62 | Second half interlace 803, first half interlace 808 |
| 63 | First half interlace 804, second half interlace 809 |

Figure 8

| RIV | Assigned interlace pattern |
|---|---|
| 55 | First 1/4 of interlace 900, Fourth 1/4 of interlace 900 |
| 56 | First 1/4 of interlace 901, Fourth 1/4 of interlace 901 |
| 57 | First 1/4 of interlace 902, Fourth 1/4 of interlace 902 |
| 58 | First 1/4 of interlace 903, Fourth 1/4 of interlace 903 |
| 59 | First 1/4 of interlace 904, Fourth 1/4 of interlace 904 |
| 60 | First 1/4 of interlace 900, Fourth 1/4 of interlace 901 |
| 61 | First 1/4 of interlace 900, Fourth 1/4 of interlace 902 |
| 62 | First 1/4 of interlace 900, Fourth 1/4 of interlace 903 |
| 63 | First 1/4 of interlace 900, Fourth 1/4 of interlace 904 |

Figure 9

| Bit value | Interlace pattern |
|---|---|
| 0 | First half interlace 110 |
| 1 | Second half interlace 110 |
| 2 | First half interlace 115 |
| 3 | Second half interlace 115 |
| 4 | First half interlace 111 |
| 5 | Second half interlace 111 |
| 6 | First half interlace 116 |
| 7 | Second half interlace 116 |

Figure 11

| Bit value | Interlace pattern |
|---|---|
| 0 | First half interlace 120, first half interlace 125 |
| 1 | Second half interlace 120, second half interlace 125 |
| 2 | First half interlace 121, first half interlace 126 |
| 3 | Second half interlace 121, second half interlace 126 |
| 4 | First half interlace 120, second half interlace 125 |
| 5 | Second half interlace 120, first half interlace 125 |
| 6 | First half interlace 121, second half interlace 126 |
| 7 | Second half interlace 121, first half interlace 126 |

Figure 12

| Bit value | Interlace pattern |
|---|---|
| 0 | First half interlace 130 |
| 1 | Second half interlace 130 |
| 2 | Second half interlace 130, first half interlace 131 |
| 3 | Second half interlace 135, first half interlace 136 |
| 4 | First half interlace 131 |
| 5 | Second half interlace 131 |
| 6 | First half interlace 131, second half interlace 136 |
| 7 | Second half interlace 131, first half interlace 136 |

Figure 13

| Bit value | Interlace pattern |
|---|---|
| 0 | First half interlace 140 |
| 1 | Second half interlace 140 |
| 2 | First half interlace 140, second half interlace 142 |
| 3 | Second half interlace 140, first half interlace 142 |
| 4 | First half interlace 141 |
| 5 | Second half interlace 141 |
| 6 | First half interlace 141, second half interlace 144 |
| 7 | Second half interlace 141, first half interlace 144 |

Figure 14

| Bit value | Interlace pattern |
|---|---|
| 0 | First 1/4 of interlace 150 |
| 1 | Second 1/4 of interlace 150 |
| 2 | Third 1/4 of interlace 150 |
| 3 | Fourth 1/4 of interlace 150 |
| 4 | First 1/2 of interlace 150 |
| 5 | Second 1/2 of interlace 150 |
| 6 | First 3/4 of interlace 150 |
| 7 | Last 3/4 of interlace 154 |

Figure 15

| RIV | Assigned interlace pattern |
|---|---|
| 55 | First half interlace 160, full interlace 161 |
| 56 | Second half interlace 160, full interlace 161 |
| 57 | First half interlace 160, full interlace 165 |
| 58 | Second half interlace 160, full interlace 165 |
| 59 | First half interlace 161, full interlace 166 |
| 60 | Second half interlace 161, full interlace 166 |
| 61 | First half interlace 160, full interlace 161, full interlace 162, full interlace 163 |
| 62 | First half interlace 165, full interlace 166, full interlace 167, full interlace 168 |
| 63 | First half interlace 160, first half interlace 161, full interlace 162, full interlace 163 |

Figure 16

| RIV | Assigned interlace pattern |
|---|---|
| 55 | Second half interlace 170, full interlace 171 |
| 56 | Second half interlace 175, full interlace 176 |
| 57 | Second half interlace 170, full interlace 171, second half interlace 175, full interlace 176 |
| 58 | Second half interlace 170, full interlace 175 |
| 59 | Second half interlace 171, full interlace 176 |
| 60 | Second half interlace 170, second half interlace 171, full interlace 175, full interlace 176 |
| 61 | Second half interlace 172, full interlace 177 |
| 62 | Second half interlace 173, full interlace 178 |
| 63 | Second half interlace 174, full interlace 179 |

Figure 17

| RIV | Assigned interlace pattern |
|---|---|
| 55 | Second half interlace 180, full interlace 181 |
| 56 | Second half interlace 182, full interlace 183 |
| 57 | Second half interlace 180, full interlace 181 |
| 58 | Second half interlace 180, full interlace 182 |
| 59 | Second half interlace 181, full interlace 183 |
| 60 | Second half interlace 180, second half interlace 181, full interlace 185, full interlace 186 |
| 61 | Second half interlace 182, full interlace 184 |
| 62 | Second half interlace 181, full interlace 183 |
| 63 | Second half interlace 180, full interlace 181, second half interlace 183, full interlace 184 |

Figure 18

| RIV | Assigned interlace pattern |
|---|---|
| 55 | First 1/4 of interlace 190, full interlace 191 |
| 56 | Second 1/4 of interlace 190, full interlace 191 |
| 57 | Third 1/4 of interlace 190, full interlace 191 |
| 58 | Fourth 1/4 of interlace 190, full interlace 191 |
| 59 | First 1/2 of interlace 190, full interlace 191 |
| 60 | Second 1/2 of interlace 190, full interlace 191 |
| 61 | First 3/4 of interlace 190, full interlace 191 |
| 62 | Last 3/4 of interlace 190, full interlace 191 |
| 63 | Second and third 1/4 of interlace 190, full interlace 191 |

Figure 19

METHOD AND APPARATUS FOR RESOURCE ALLOCATION ON UNLICENSED SPECTRUM

TECHNICAL FIELD

The subject application relates to a method and apparatus for communication, and especially to a method and apparatus for communication resource allocation.

BACKGROUND OF THE INVENTION

In Rel-14 Long Term Evolution Enhanced Licensed Assisted Access (LTE eLAA), interlace-based waveform is adopted as uplink waveform for unlicensed spectrum. In LTE, the bandwidth of a carrier is 20 MHz. The 20 MHz bandwidth includes 100 Physical Resource Blocks (PRBs), which are partitioned into 10 interlaces. One or more interlaces may be assign to a UE for uplink transmission. For 3GPP 5G New Radio (NR), the bandwidth of a carrier may be more than 20 MHz, e.g., 40, 60, 80 or 100 MHz. In this case, the resource of one interlace may be too much for a UE. Therefore, the resource may be wasted when the UE has small traffic to be transmitted.

SUMMARY

It is desirable to provide a solution to improve the resource utilization efficiency.

One embodiment of the subject application provides a method comprising: receiving a Downlink Control Information (DCI) assigning frequency resources of a carrier for transmitting data on the carrier, wherein the frequency resources include a first set of Physical Resource Blocks (PRBs) and a second set of PRBs and the frequency resources span over a predefined percentage of a bandwidth of the carrier, and the bandwidth of the carrier is greater than 20 MHz; and transmitting the data on the first set of PRBs and the second set of PRBs.

Another embodiment of the subject application provides a method comprising: transmitting a Downlink Control Information (DCI) to a remote unit for assigning frequency resources of a carrier for transmitting data on the carrier, wherein the frequency resources include a first set of Physical Resource Blocks (PRBs) and a second set of PRBs and the frequency resources span over a predefined percentage of a bandwidth of the carrier, and the bandwidth of the carrier is greater than 20 MHz; and receiving the data from the remote unit on the first set of PRBs and the second set of PRBs.

Yet another embodiment of the subject application provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement a method comprising: receiving a Downlink Control Information (DCI) assigning frequency resources of a carrier for transmitting data on the carrier, wherein the frequency resources include a first set of Physical Resource Blocks (PRBs) and a second set of PRBs and the frequency resources span over a predefined percentage of a bandwidth of the carrier; and the bandwidth of the carrier is greater than 20 MHz; and transmitting the data on the first set of PRBs and the second set of PRBs.

Still another embodiment of the subject application provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement a method comprising: transmitting a Downlink Control Information (DCI) to a remote unit for assigning frequency resources of a carrier for transmitting data on the carrier, wherein the frequency resources include a first set of Physical Resource Blocks (PRBs) and a second set of PRBs and the frequency resources span over a predefined percentage of a bandwidth of the carrier, and the bandwidth of the carrier is greater than 20 MHz; and receiving the data from the remote unit on the first set of PRBs and the second set of PRBs.

BRIEF DESCRIPTION OF THE DRAWINGS

FIG. 8 illustrates an example of predefined interlace patterns with 15 kHz subcarrier spacing and 40 MHz bandwidth.

FIG. 9 illustrates an example of predefined interlace patterns with 30 kHz subcarrier spacing and 80 MHz bandwidth.

FIG. 11 illustrates an example of predefined interlace patterns for 15 kHz subcarrier spacing and 40 MHz bandwidth.

FIG. 12 illustrates an example of predefined interlace patterns for 15 kHz subcarrier spacing and 40 MHz bandwidth.

FIG. 13 illustrates an example of predefined interlace patterns for 15 kHz subcarrier spacing and 40 MHz bandwidth.

FIG. 14 illustrates an example of predefined interlace patterns for 30 kHz subcarrier spacing and 40 MHz bandwidth.

FIG. 15 illustrates an example of predefined interlace patterns for 30 kHz subcarrier spacing and 80 MHz bandwidth.

FIG. 16 illustrates an example of predefined interlace patterns on 15 kHz subcarrier spacing and 40 MHz bandwidth.

FIG. 17 illustrates an example of predefined interlace patterns on 15 kHz subcarrier spacing and 40 MHz bandwidth.

FIG. 18 illustrates an example of predefined interlace patterns on 30 kHz subcarrier spacing and 40 MHz bandwidth.

FIG. 19 illustrates an example of predefined interlace patterns on 30 kHz subcarrier spacing and 80 MHz bandwidth.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments provide a method and apparatus for downlink (DL) or uplink (Lit) data transmission on unlicensed spectrum. To facilitate understanding, embodiments are provided under specific network architecture and new service scenarios, such as 3GPP 3GPP LIE Release 8 and so on. Persons skilled in the art know very well that, with the development of network architecture and new service scenarios, the embodiments in the present disclosure are also applicable to similar technical problems.

Figure 1:
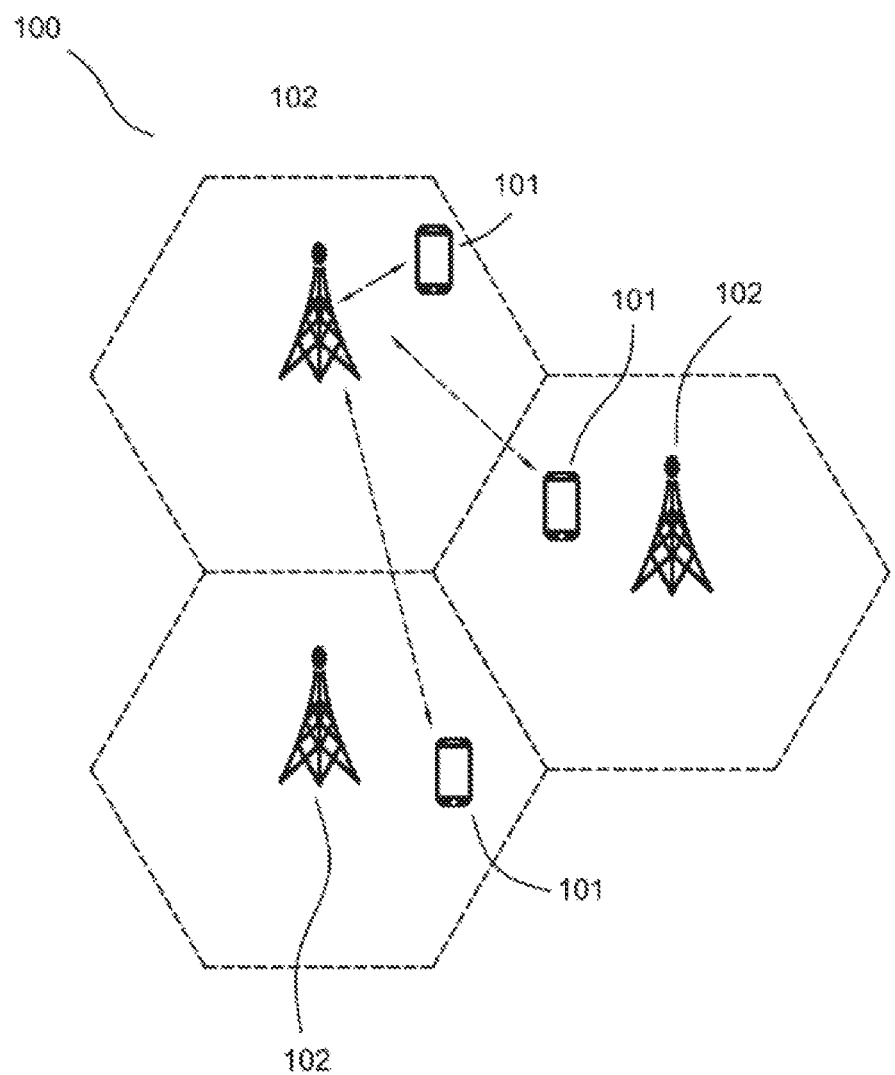
FIG. 1 illustrates a wireless communication system according to an embodiment of the present disclosure.

FIG. 1 depicts a wireless communication system 100 according to an embodiment of the present disclosure.

As shown in FIG. 1, the wireless communication system 100 includes UEs 101 and BSs 102. In particular, the wireless communication system 100 includes three UEs 101 and three BSs 102 for illustrative purpose, Even though a specific number of UEs 101 and BSs 102 are depicted in FIG. 1, one skilled in the art will recognize that any number of UEs 101 and BSs 102 may be included in the wireless communication system 100.

The UEs 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UEs 101 include wearable devices, such as smart watches, fitness bands, optical head-mounted displays, or the like. Moreover, the UEs 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UEs 101 may communicate directly with the BSs 102 via uplink (UL) communication signals.

The BSs 102 may be distributed over a geographic region. In certain embodiments, each of the BSs 102 may also be referred to as an access point, an access terminal, a base, a macro cell, a Node-B, an enhanced Node B (eNB); a gNB, a Home Node-B, a relay node, or a device, or described using other terminology used in the art. The BSs 102 are generally part of a radio access network that may include one or more controllers communicably coupled to one or more corresponding BSs 102.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In one embodiment, the wireless communication system 100 is compatible with the 5G new radio (NR) of the 3GPP protocol, wherein the BSs 102 transmit data using an orthogonal frequency division multiplexing (OFDM) modulation scheme on the DL and the UEs 101 transmit data on the UL using a single-carrier frequency division multiple access (SC-FDMA) or OFDM scheme, More generally, however, the wireless communication system 100 may implement some other open or proprietary communication protocols, for example, WiMAX, among other protocols.

In other embodiments, the BSs 102 may communicate using other communication protocols, such as the IEEE 802.11 family of wireless communication protocols. Further, in some embodiments, the BSs 102 may communicate over licensed spectrums, whereas in other embodiments the BSs 102 may communicate over unlicensed spectrums. The present disclosure is not intended to be limited to the implementation of any particular wireless communication system architecture or protocol. In another embodiment, the BSs 102 may communicate with the UEs 101 using the 3GPP 5G protocols.

In order to achieve fair coexistence between NR-U and Wi-Fi on unlicensed spectrum, NR-U operating bandwidth is an integer multiple of 20 MHz, A channel access procedure, also named Listen-Before-Talk (LBT) test, is performed in units of 20 MHz. For a bandwidth larger than 20 MHz, e.g., 40/60/80/100 MHz, these bandwidths are partitioned into subband, each subband has a bandwidth of 20 MHz.

Figure 2:
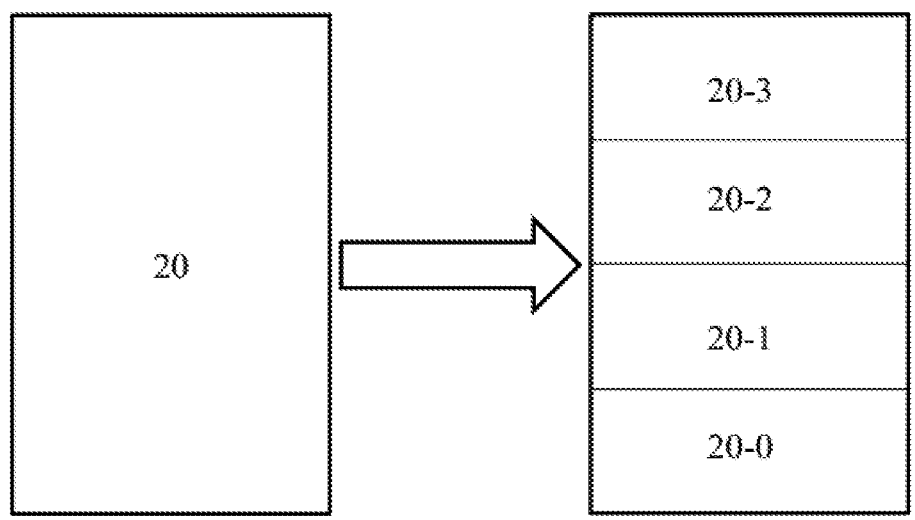
FIG. 2 illustrates a subband-basal operation for a wide carrier.

For DL transmission, the base station performs the LBT test per subband (e.g., 20 MHz per subband) and aggregates available sub-bands for a single Physical Downlink Shared Channel (PDSCH). That is, when the LBT tests for some sub-bands are successful while for other sub-bands are not, then the base station can transmit data on the subbands with successful LBT result. For example, as shown in FIG. 2, reference numeral 20 represents a wideband with a bandwidth of 80 MHz, and reference numerals 20-0, 20-1, 20-2, and 20-3 represent subbands with a bandwidth of 20 MHz. If subbands 20-2 and 20-3 have successful LBT results while subbands 20-0 and 20-1 do not, then PDSCH transmission of the base station can only be transmitted on subbands 20-2 and 20-3.

For UL transmission, UE performs LBT test per assigned sub-bands 20 MHz per subband) and transmits Physical Uplink Shared Channel (PDSCH) on the available sub-bands. Namely, when LBT for some of assigned sub-bands are successful while for other sub-bands are not, then UE can transmit data on the sub-bands with successful LBT. For instance, as depict in FIG. 2, since the LBT results of subbands 20-2 and 20-3 are successful, subbands 20-2 and 20-3 can be used for PUSCH transmission.

In addition, wireless signal transmission on unlicensed spectrum should meet the requirements of regulation subject to the management of the located country/region. Hence, the design of uplink waveform for NR-U PUSCH/PUCCH should meet the regulation requirements on unlicensed spectrum.

The requirements mainly include two aspects:
(1) Occupied channel bandwidth (OCB): the bandwidth containing 99% of the power of the signal, shall be between 80% and 100% of declared nominal channel bandwidth; and (2) Maximum Power Spectrum Density (PSD) with a resolution bandwidth of 1 MHz, e.g., 10 dBm/MHz.

These two requirements dictate that a signal which occupies a small portion of the channel bandwidth cannot be transmitted at the maximum available power at the UE due to the PSD and OCB constraints.

Figure 3:
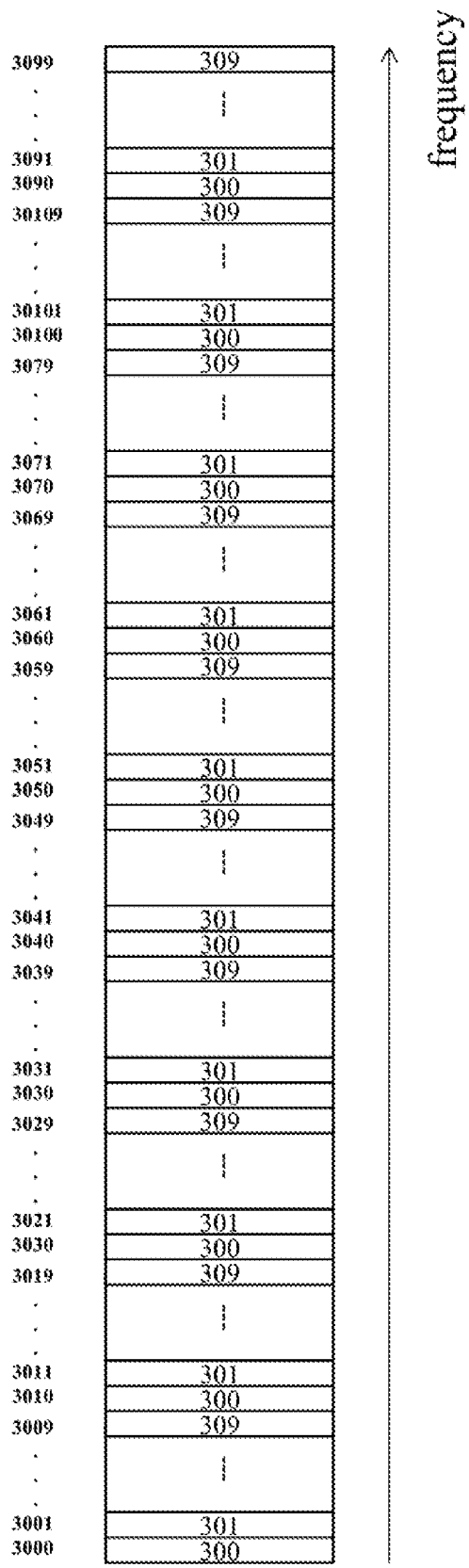
FIG. 3 illustrates an example of an interlace-based waveform in Rel-14 LTE eLAA.

In Rel-14 LTE eLAA, interlace-based waveform is adopted as uplink waveform for unlicensed spectrum. FIG. 3 shows an example of such interlace-based waveform. The bandwidth in FIG. 3 is a 20 MHz bandwidth and includes 100 available PRBs. The 100 PRBs are partitioned into 10 interlaces. Each interlace has 10 PRBs and is equally distributed within the whole bandwidth. In this way, each interlace spans more than 80% system bandwidth so that the regulation requirements of OCB can be met. Moreover, 10 PRBs of one interlace are equally spaced in frequency so that two adjacent PRBs of one interlace are separated by 1.8 MHz distance and power boosting can be realized for each PRB of one interlace.

Referring to FIG. 3, which depicts an example of the relationship among interlace and PRBs in Rel-14 LTE eLAA. In FIG. 3, the carrier bandwidth includes 100 available PRBs, which are PRB0, PRB1, PRB2, . . . , PRB99, and are represented with the reference numerals 3000, 3001, 3002, . . . , 3099, respectively. These PRBs are partitioned into 10 interlaces, the first interlace, the second interlace, . . . , the tenth interlace, which are represented with the reference numerals 300, 301, 302, . . . , 309, respectively. Interlace 300 includes PRB0, PRB10, PRB20, . . . PRB90; interlace 301 comprises of PRB1, PRB11, PRB21, . . . PRB 91; interlace 302 comprises PRB2, PRB12, PRB22, . . . PRB 92; interlace 303 comprises PRB3, PRB13, PRB23, . . . PRB 93; interlace 304 comprises PRB4, PRB14, PRB24, . . . PRB 94; interlace 305 comprises PRB5, PRB15, PRB25, . . . PRB 95; interlace 306 comprises PRB6; PRB16, PRB26, . . . PRB 96; interlace 307 comprises PRB7, PRB17, PRB27, . . . PRB 97; interlace 308 comprises PRB8, PRB18, PRB28, . . . PRB 98; and interlace 309 includes PRB9, PRB19, PRB29, . . . , PRB99.

For NR, interlace-based waveform can also achieve power boosting under PSD limit and meet the regulatory requirements for occupied channel bandwidth. The subcarrier spacing of NR could be $15*2^n$ kHz, where n is an integer. For example, the subcarrier spacing may be 15, 30, 60 kHz for Frequency Range 1 (FR1) and different subcarrier spacing values can support different maximum bandwidths. The detailed NR bandwidth configuration is shown in Table 1 below. It is noted that maximum number of PRBs, $N_{RB}$, are determined based on the subcarrier spacing and bandwidth. For example, if the bandwidth is 20 MHz, and the Subcarrier Spacing (SCS) is 15 kHz; the maximum number of PRBs is 106; if the bandwidth is 20 MHz, and the SCS is 30 kHz, the maximum number of PRBs is 51.

TABLE 1

Maximum transmission bandwidth configuration NRB

| sub-carrier spacing (SCS) (kHz) | 5 MHz $N_{RB}$ | 10 MHz $N_{RB}$ | 15 MHZ $N_{RB}$ | 20 MHZ $N_{RB}$ | 25 MHZ $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

For 20 MHz bandwidth in NR-U, Radio Access Network Working Group 1 (RAN1) has agreed to use 10 interlaces with 10 or 11 PRBs per interlace for 15 kHz subcarrier spacing, and to use 5 interlaces with 10 or 11 PRBs per interlace for 30 kHz subcarrier spacing. The agreement is made in RAN1 Ad hoc 2019 #1 and is listed below:

"For interlace transmission of at least PUSCH and PUCCH, the following PRB-based interlace design is supported for the case of 20 MHz carrier bandwidth:
15 kHz SCS: M=10 interlaces with N=10 or 11 PRBs/interlace
30 kHz SCS: M=5 interlaces with N=10 or 11 PRBs/interlace
Note: PRACH design to be considered separately, including multiplexing aspects with PUSCH and PITCH For more than 20 MHz bandwidth, e.g., 40/60/80/100 MHz, a working assumption is made in RAN1 Ad hoc 2019 #1 and not confirmed as agreement in RAN1 #96 meeting. The assumption is presented as follows:
For a given SCS, the following interlace design is supported at least for PUSCH:
Same spacing (M) between consecutive PRBs in an interlace for all interlaces regardless of carrier BW, i.e., the number of PRBs per interlace is dependent on the carrier bandwidth
Point A is the reference for the interlace definition
For 15 kHz SCS, M=10 interlaces and for 30 kHz SCS, =5 interlaces for all bandwidths In this disclosure; M is denoted as the number of interlaces, N is the number of PRBs of one interlace. N may be different for different interlaces due to the total number of PRBs of one carrier may not be divisible by M. For example; N may be 10 or 11 PRBs as indicated above.

Figure 4:
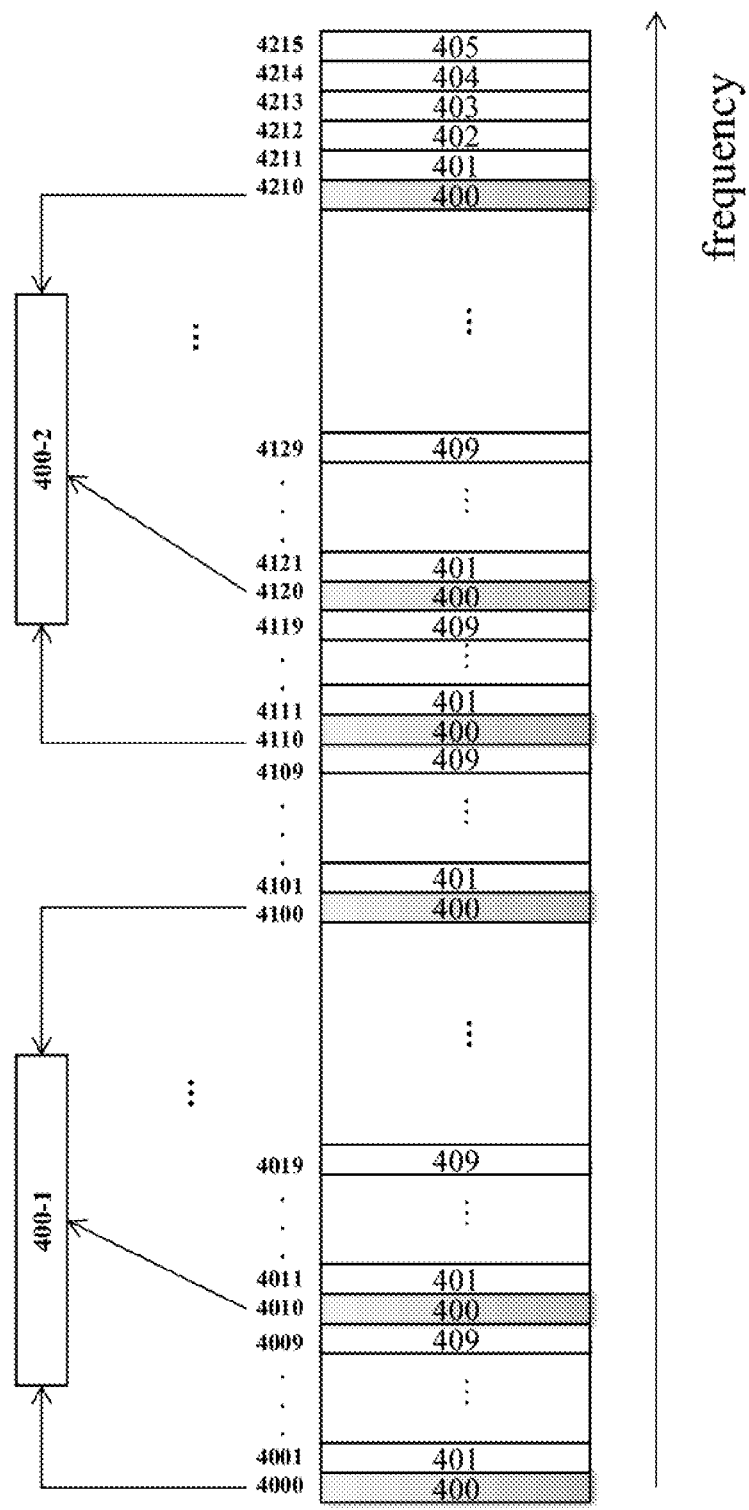
FIG. 4 illustrates an example of the configuration of PRB for NR-U 20 MHz bandwidth.

FIG. 4 depicts an example of the configuration of PRBs for NR-U 40 MHz bandwidth and 15 kHz subcarrier spacing. According to table 1, there are 216 PRBs, which are represented with the reference numerals 4000, 4001, 4002, ... 4105, 4106, 4107; ..., 4215. The PRBs are partitioned into 10 interlaces, which are represented with the reference numerals 400, 401, 402, ..., 409. Interlaces 400, 401, ..., 405 include 22 PRBs, and interlaces 406, 407, ... 409 include 21 PRBs. For example, interlace 400 includes 22 PRBs represented with the reference numerals 4000, 4010, 4020, ..., 4090, 4100, ..., 4210. Interlace 409 includes 21 PRBs represented with the reference numerals 4009, 4019, ..., 4209. The first half of the interlace 400, which is represented using the reference numeral 400-1, includes 11 PRBs denoted as 4000; 4010, 4020, ..., 4090, 4100, and the second half of the interlace 400 which is represented using the reference numeral 400-2, includes 11 PRBs denoted as 4110, 4120, ..., 4210.

In the following embodiments, the first half of an interlace means a half of the interlace in lower frequency part of the interlace and the second half of the interlace means a half of the interlace in higher frequency part of the interlace. In the same manner, the first quarter of an interlace means a quarter of the interlace in the lowest frequency part of the interlace, the fourth quarter of an interlace means a quarter of the interlace in the highest frequency part of the interlace, the second quarter of an interlace means a quarter of the interlace in the secondary lowest frequency part of the interlace, and the third quarter of an interlace means a quarter of the interlace in the secondary highest frequency part of the interlace. Nevertheless, persons with ordinary skills in the art would easily derive other orders for numbering half interlaces or quarter interlaces which are not limited to the embodiments in the subject disclosure.

More generally, for a wideband carrier with M interlaces and N PRBs per interlace, then interlace x, $0<=x<=M-1$, comprises of PRBs at the locations given by: x, x+M, x+2*M, x+(N-1)*M, where M can also be viewed to represent spacing between consecutive PRBs of the interlace. In case one interlace contains odd number of PRBs, e.g., N is odd, in one embodiment, the first half of the interlace contains the first $\lceil N/2 \rceil$ PRBs of the interlace then the second half of the interlace contains the last $N-\lceil N/2 \rceil$ PRBs of the interlace; in another embodiment, the first half of the interlace contains the first $\lfloor N/2 \rfloor$ PRBs of the interlace, then the second half of the interlace contains the last $N-\lfloor N/2 \rfloor$ PRBs of the interlace. For example, the first half of the interlace 409 includes $\lfloor 21/2 \rfloor=10$ PRBs, and the second half of the interlace 409 includes the last $21-\lfloor 21/2 \rfloor=11$ PRBs. For another example, the first quarter of the interlace 401 includes first $\lfloor 22/4 \rfloor=5$ PRBs, the second quarter of the interlace 401 includes second $\lfloor 22/4 \rfloor=5$ PRBs, the third quarter of the interlace 401 includes third $\lfloor 22/4 \rfloor=5$ PRBs, and the fourth quarter of the interlace 401 includes the last $22-3*\lfloor 22/4 \rfloor=7$ PRBs, and so on.

As shown in the above working assumption, for the carrier bandwidth (BW) larger than 20 MHz, the same spacing (M) between consecutive PRBs in an interlace is maintained for all interlaces regardless of the carrier BW, i.e. the number of PRBs per interlace (N) is dependent on the carrier bandwidth.

Keeping same interlace spacing with increasing bandwidth is a straightforward and simple way to scale the interlace design from 20 MHz to wider bandwidth. However, there are some drawbacks on resource allocation for wideband interlace structure.

For instance, for 30 kHz subcarrier spacing and 80 MHz bandwidth, there are 5 interlaces according to the working assumption. According to table 1, the maximum number of PRB is 217, 217/5=43.4, so one interlace may contain 43 or 44 PRBs, which provides too much resource for small packet transmission. Furthermore, the user multiplexing capacity is low. In order to further improve resource utilization efficiency, partial interlace is proposed for assigning a partial interlace to one UE.

Even though the partial interlace allocation is obviously against regulatory requirements for occupied channel bandwidth, it can resolve a problem where a single full interlace provides too much resource for small packet transmission by providing bandwidth part (BWP) configuration and switching. In NR Rel-15, up to four BWPs can be configured for one UE on one serving cell and only one BWP is active in a given time instance. Those BWPs can be configured with different numerologies, different bandwidths even different central frequencies. Using Downlink Control Information (DCI) or inactivity Timer, the active BWP can be dynamically switched based on the variation of user traffic. In case of a small traffic, UE can be dynamically switched to a BWP configured with smaller bandwidth; in case of a large traffic, UE can be dynamically switched to another BWP with larger bandwidth. Due to dynamic BWP switching; partial interlace is not necessary for NR-U.

The main intention of BWP is to enable multiple UEs with different Rx bandwidth capabilities operated on the same carrier. When using the same interlace spacing over a wide carrier, there are some potential issues associated with resource allocation when multiple UEs with different Rx bandwidth capabilities are operated on the same carrier.

Figure 5:
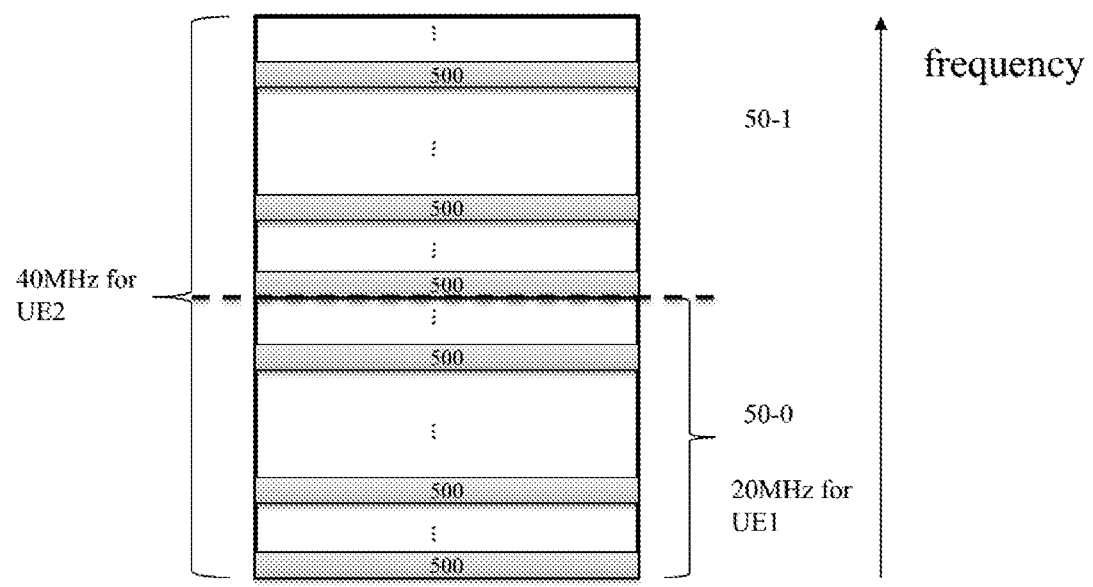
FIG. 5 illustrates a wideband operation for multiple UEs on 40 MHz bandwidth and 15 kHz SCS.

As shown in FIG. 5, for a 15 kHz subcarrier spacing and 40 MHz carrier bandwidth, according to the above, there are 2 subbands: 50-0 and 50-1, each with a bandwidth of 20 MHz. Each interlace in the carrier contain 21 or 22 PRBs as mentioned above. The PRBs in each interlace span over subbands 50-0 and 50-1. Assuming the active BWP of UE1 only includes subband 50-0 and the active BWP of UE2 includes both subbands 50-0 and 50-2, if interlace 500 is assigned to UE1, then interlace 500 cannot be assigned to UE2 for collision avoidance. In this sense, the PRBs of interlace 500 in subband 50-1 are wasted.

Figure 6:
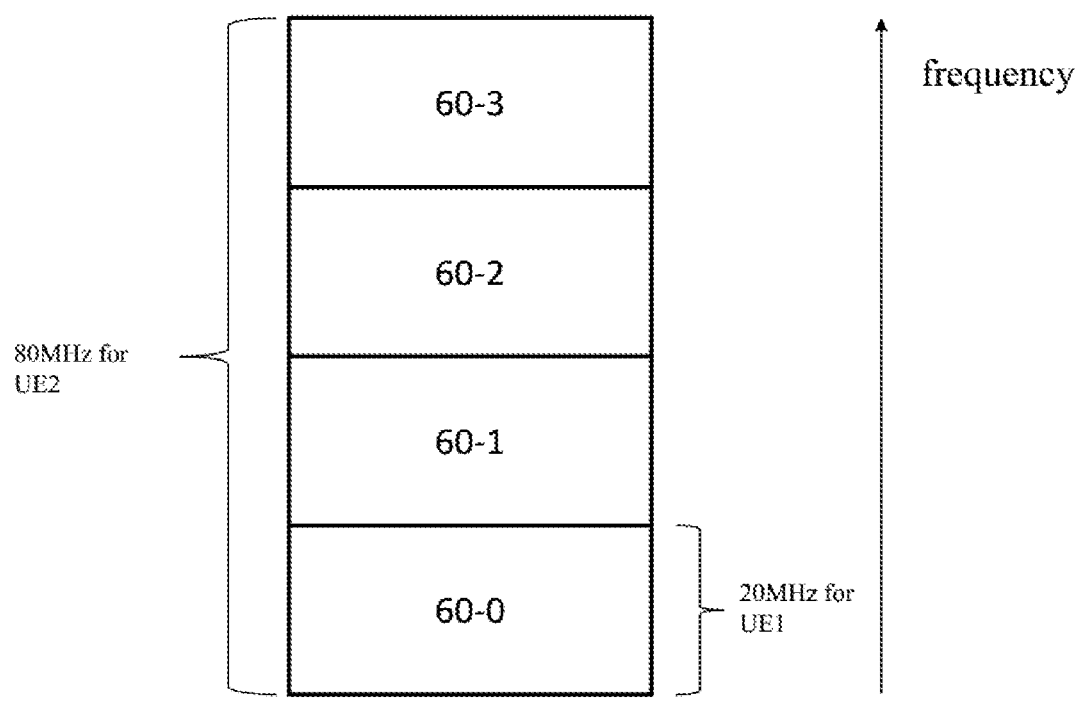
FIG. 6 illustrates a wideband operation for multiple UEs on 80 MHz bandwidth and 30 kHz SCS.

As shown in FIG. 6, for 30 kHz subcarrier spacing and 80 MHz carrier bandwidth there are 4 subbands with each subband of 20 MHz bandwidth. According to table 1, the number of PRB with 30 kHz SCS and 20 MHz bandwidth is 51 PRB. In FIG. 6, assuming the active BWP of UE1 only includes subband 60-0, so there are 5 interlaces and the first interlace may contain PRBs at locations associated with PRB 0, 5, 10, 15, 45, 50. Assuming the active BWP of UE2 includes subbands 60-0, 60-1, 60-2 and 60-3, with the total number of PRBs for UE2 being 217 according to table 1 and 5 interlaces used, the first interlace for UE2 may comprise PRBs at PRB locations given by 0, 5, 10, 15, 20, ..., 100, 105, 110, 115, ..., 205, 210. Consequently, if the first interlace is assigned to UE1, then it cannot be assigned to UE2 for collision avoidance. In this sense, the PRBs of the first interlace 600 in subband 60-1, subband 60-2 and subband 60-3, i.e., PRB 55, 60, ..., 205, 210, are wasted.

To fully reuse available resources, a smaller resource granularity than a full interlace can be introduced, e.g., partial interlace allocation. For example, in FIG. 5, if an interlace is assigned to a UE in part, the rest of the interlace may be assigned to another UE. However, this resource allocation for the second UE can't meet the regulatory requirements defined for occupied channel bandwidth being more than 80% of the operating bandwidth. Hence, the partial interlace may not be suitable.

In this disclosure, we focus on the wideband operation and provide some alternatives to fully reuse the available resource and meet the regulatory requirements defined for occupied channel bandwidth. Several solutions are proposed for resource allocation on wideband unlicensed spectrum so as to further improve channel utilization efficiency.

In a preferred embodiment, only partial interlaces are assigned to one UE.

In order to comply with the regulatory requirements for occupying channel bandwidth, for a single UE, at least two partial interlaces which span across the subbands of the UE's active BWP should be assigned. For a carrier of 40 MHz, at least two half interlaces which span across the subbands of the UE's active BWP should be assigned.

Figure 7:
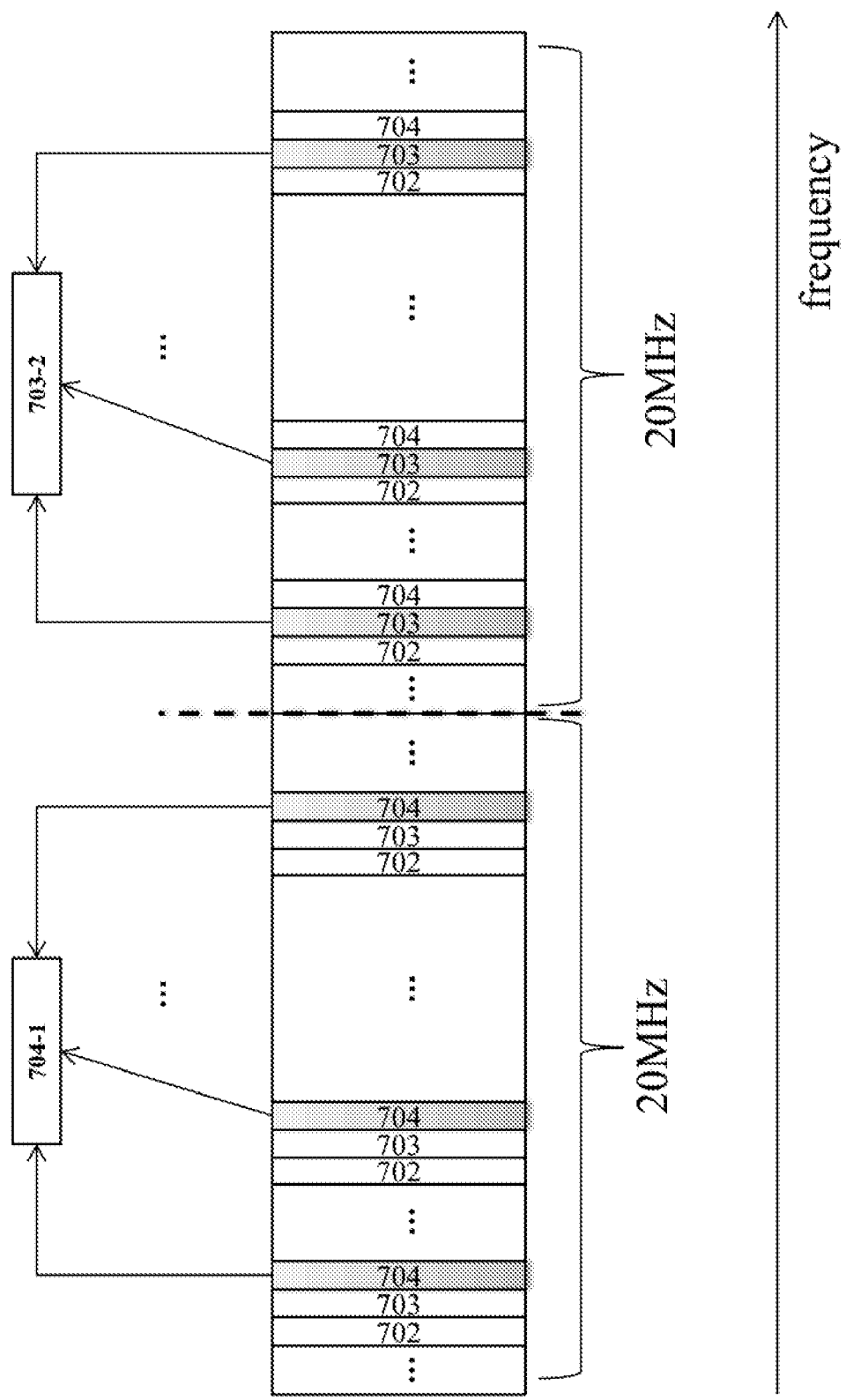
FIG. 7 illustrates a interlace assignment according to art embodiment of the subject disclosure.

As shown in FIG. 7, the active BWP of a UE is 40 MHz and two subbands of the active BWP are divided by a dotted line. In this case, the second half of interlace 703 and first half of interlace 704 are assigned by the base station to the UE. As can be seen in FIG. 7, the occupied channel bandwidth spans across the two subbands of the UE's active BWP. Other assignments could also span across the subbands of the UE's active BWP, for example, the first half of interlace 702 and second half of interlace 704, the first half of interlace 703 and second half of interlace 702, and so on.

The above assignment could be indicated by predefined interlace patterns. The principles for designing the partial interlace patterns are:
(1) at least two partial interlaces included in each of predefined interlace patterns;
(2) equal space between two assigned partial interlaces for PSD boosting; or
(3) at least one partial interlace in the lowest subband and another partial interlace in the highest subband.

FIG. 8 illustrates an example of predefined interlace patterns with 15 kHz subcarrier spacing, 40 MHz bandwidth and 10 interlaces: 800, 801, . . . 809, Based on the above principle, a Resource indication Value (RIV) can be assigned a value from 0 to 54 with each value representing one of contiguous interlace allocation and can be assigned a value from 55 to 63 with each value representing a predefined interlace pattern. The range of the RIV value can be determined by the unused code points for indicating the assigned interlaces, which will be discussed later in the subject disclosure. The RIV values in FIG. 8 may be replaced by other bit values for indicating the corresponding assigned interlace pattern.

For example, RIV value of 55 indicates the assigned interlace pattern is defined by a first half of interlace 800 and a second half of interlace 805. This value indicates two half interlaces, and the space between the two assigned interlaces 800 and 805 is equal, and it includes a half interlace in subband 0 and another half interlace in subband 1. Here, the space means the interlace difference of two assigned interlaces. For example, for 15 kHz subcarrier spacing, there are 10 interlaces, interlace 0, 1, 2, 3, 4, 5, 6, 7, 8 and 9. The combination of interlace 0 and interlace 5, the combination of interlace 1 and interlace 6, the combination of interlace 2 and interlace 7, the combination of interlace 3 and interlace 8, and the combination of interlace 4 and interlace 9, have equal space in terms of interlace index. It is beneficial to assign the equally spaced interlace combination for power boosting. As show in FIG. 8, the combination of interlace 800 and interlace 805, the combination of interlace 801 and interlace 806, the combination of interlace 802 and interlace 807, the combination of interlace 803 and interlace 808, and the combination of interlace 804 and interlace 809, have equal space in terms of interlace index.

FIG. 9 illustrates another example of predefined interlace patterns with 30 kHz subcarrier spacing, 80 MHz bandwidth and 5 interlaces: 900, 901, . . . 904. The 80 MHz bandwidth includes four subbands of 20 MHz each, for example, subband 90-0, subband 90-1, subband 90-2, and subband 90-3. RIV value of 55 shown in FIG. 9 indicates that the interlace assigned to an UE is represented by a first quarter of interlace 900, and fourth quarter of interlace 900. This assigned RIV interlace pattern value indicates two partial interlaces, first quarter of interlace 900, fourth quarter of interlace 900, and it includes a quarter interlace in subband 90-0 and another quarter interlace in subband 90-3. The RIV value in FIG. 9 may be replaced by other bit values for indicating the corresponding assigned interlace pattern.

It should be understood that FIGS. 8 and 9 are merely examples of the predefined interlace patterns, and claimed subject matter is not limit in these predefined interlace patterns.

In another preferred embodiment, the full interlace and the potential partial interlace are separately indicated to one UE.

Figure 10:
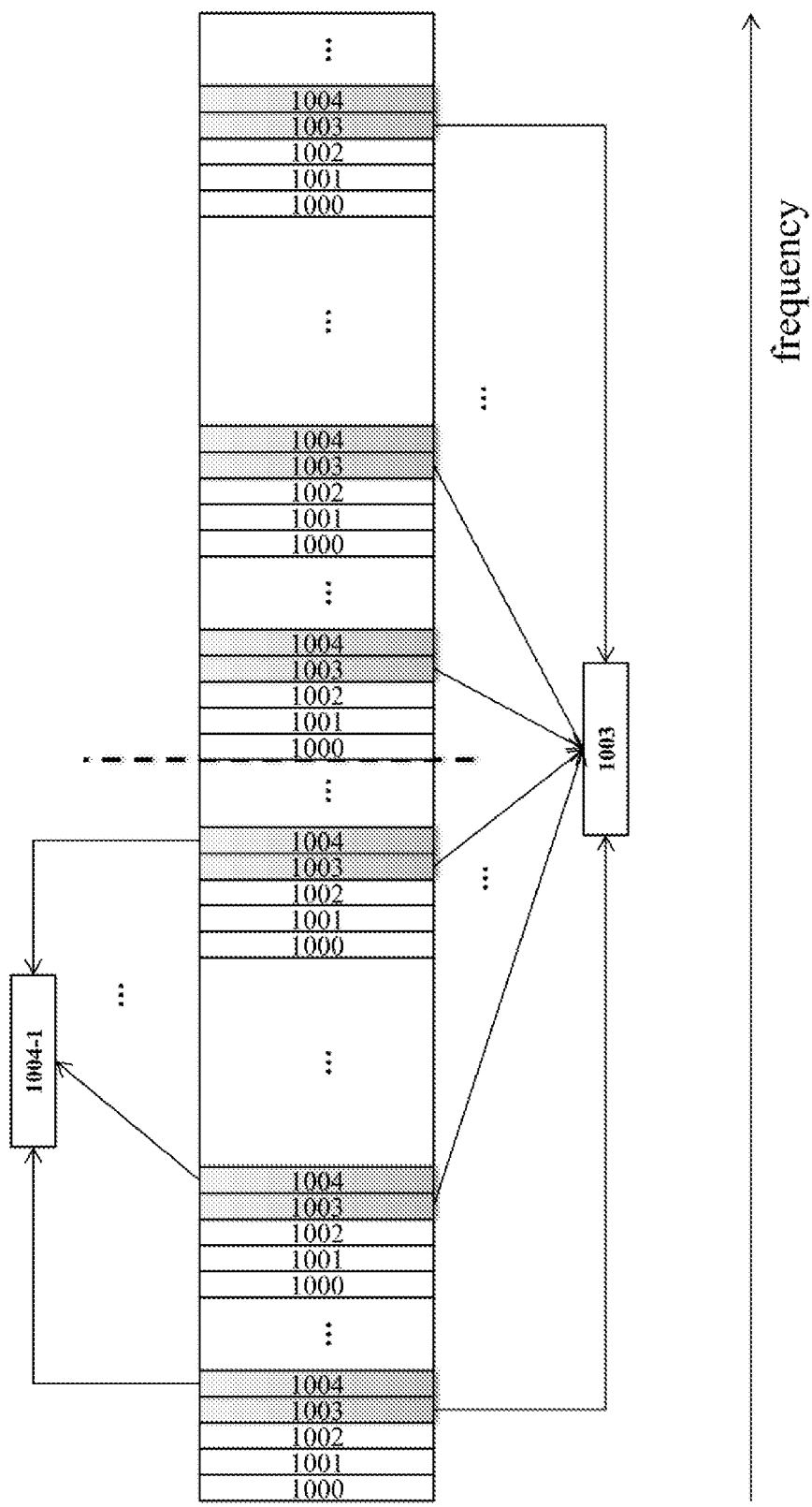
FIG. 10 illustrates a interlace assignment according to an embodiment of the subject disclosure.

As depicted in FIG. 10, a full interlace 1003 and a first half of interlace 1004 are assigned by the base station to the UE. Other assignments are also proposed in this disclosure, for example, a full interlace 1000 and a second half of interlace 1001, and second half of interlace 1003, and so on. Since at least one full interlace is arranged, it is ensured that more than 80% of BWP is occupied.

For a single UE, a full interlace allocation can be assigned together with additional partial interlace, but a standalone partial interlace cannot be assigned. In this way, not only the regulatory requirements for occupied channel bandwidth can be met but also the resource utilization efficiency is improved.

In order to assign the partial interlace to an LE, a new field is introduced in Downlink Control information (DCI), for example, the UL grant, to indicate the number of partial interlaces to the LIE, the DCI may be DCI format 0_0 or 0_1 or other new formats for PUSCH scheduling. Therefore, there are two separate fields, one field is used to indicate the full interlace, and the other field, namely, the new field is used to indicate only the number of partial interlaces.

In addition, the new field for indicating assigned partial interlaces can assign contiguous interlaces by interlace-based UL resource allocation type 1; alternatively, the new field can assign non-contiguous interlaces based on predefined interlace allocation pattern; or the new field could also assign interlaces by bitmap-based indication with each bit corresponding to one interlace.

The principles for designing the partial interlace patterns are:
(1) only partial interlaces included because the full interlace assignment is indicated in additional separate field; and
(2) equal space between two assigned partial interlaces for PSD boosting.

FIG. 11 illustrates an example on predefined interlace pattern for 15 kHz subcarrier spacing, 40 MHz bandwidth. For example, when a Bit value is set to 0, it indicates the assigned interlace pattern to be the First half interlace 110.

FIG. 12 illustrates an example on predefined interlace pattern for 15 kHz subcarrier spacing and 40 MHz bandwidth. So 10 interlaces 120, 121, . . . 129 are included in FIG. 12. For example, the Bit value 0 indicates the assigned interlace is first half interlace 120, first half interlace 125. The first half interlace 120 and first half interlace 125 are equally spaced.

FIG. 13 illustrates an example on predefined interlace pattern for 15 kHz subcarrier spacing and 40 MHz bandwidth. So 10 interlaces 130, 131, . . . 139 are included in FIG. 13. For example, the Bit value 3 indicates the assigned interlace is Second half interlace 135, first half interlace 136. The Second half interlace 135 and first half interlace 136 are contiguous partial interlaces in frequency domain.

FIG. 14 illustrates an example on predefined interlace pattern for 30 kHz subcarrier spacing and 40 MHz bandwidth. So 5 interlaces 140, 141, . . . 144 are included in FIG. 14. For example, the Bit value 3 indicates the assigned interlace is second half interlace 140, and first half interlace 142.

FIG. 15 illustrates an example on predefined interlace pattern for 30 kHz subcarrier spacing and 80 MHz bandwidth. So 5 interlaces 150, 151, . . . 154 are included in FIG. 15. The 80 MHz bandwidth has the bandwidth of four 20 MHz subband, for example, subband 15-0, subband 15-1, subband 15-2, and subband 15-3. The Bit value 0 indicates the assigned interlace is first ¼ of interlace 150, that is, the part of interlace within subband 15-0.

It should be understood that FIGS. 11-15 are merely examples of the predefined interlace patterns, and claimed subject matter is not limit in these predefined interlace patterns.

In another preferred embodiment; the full interlace and the potential partial interlace are jointly indicated to one UE.

In this embodiment, it is proposed to use half interlace as the resource unit. A new field is introduced in UL grant for indicating the contiguous half interlaces for resource allocation. To meet the regulatory requirements on occupied channel bandwidth, for one UE, at least two contiguous half interlaces which span across the subbands of the UE's active IMP should be assigned.

In order to indicate to a LE the contiguous half interlaces, two parameters are needed, 1): the starting index of the half interlace, and 2) the number of the assigned contiguous half interlaces.

For 15 kHz SCS and 40 MHz bandwidth, there are 10 interlaces, i.e., 20 half interlaces. Assuming that the starting half interlace index is from 0 to 19, the potential interlace allocation patterns would be calculated as follows:
(1) If the starting interlace index is 0, and the number of assigned contiguous half interlaces might be 1, 2, . . . , 20, that is 20 possibilities;
(2) If the starting interlace index is 1, and the number of assigned contiguous half interlaces might be 1, 2, . . . , 19, that is 19 possibilities;
. . .
(3) If the starting interlace index is 19, and the number of assigned contiguous half interlaces can only be 1, that is 1 possibility.

Therefore, the total possibilities of assigned contiguous half interlaces is 20+19+ . . . +1=210. In order to indicate one of the 210 possibilities, since $2^7 < 210 < 2^8$, 8 bits are needed in UL grant for indicating the assigned contiguous half interlaces.

For 30 kHz SCS and 40 MHz bandwidth, there are 5 interlaces, i.e., 10 half interlaces. Based on similar calculation, 6 bits are needed in UL grant for indicating the assigned contiguous half interlaces. $2^6$ equals to 64, and 64 minus 55 equals to 9, therefore, 9 code points unused. Persons skilled in the art understand that the value of 6 bits ranges from 0 to 63, since indicating the 55 possibilities would occupy 55 values, thus the remaining 9 values ranges from 55 to 63. These remaining 9 code points are used as RIV value indicating one of predefined interlace allocation patterns.

To meet the regulation requirements on occupied channel bandwidth, e.g., for one UE including two subbands in its active BWP, second half of one interlace and first half of another interlace can be assigned to the UE so as to cover all the two subbands of the UE. Certainly, first half of one interlace and second half of the interlace can also be assigned to the UE as one full interlace.

When UE is indicated with more than two contiguous half interlaces in addition to certain full interlaces, there are at most two half interlaces, one in the first assigned interlace and another in the last assigned interlace.

In another preferred embodiment, the full interlace and the potential partial interlace are jointly indicated to one UE. The resource unit is defined per subband. The total number of resource units is equal to the number of full interlaces multiplied by the number of subbands. For example, for 30 kHz SCS and 80 MHz bandwidth, there are 5 interlaces. Thus, there are 5*4=20 partial interlaces. That is, the resource unit is a quarter interlace.

A new field is introduced in UL grant for indicating the assigned contiguous resource units. To meet the regulation requirements on occupied channel bandwidth, for one UE, assuming the number of subbands within the UE's active BWP is X, then at least X contiguous resource units which span across the subbands of the UE's active BWP should be assigned.

For 15 kHz SCS and 40 MHz bandwidth, there are 10 interlaces and two subbands, i.e., 20 half interlaces. To meet the regulatory requirements for occupied channel bandwidth, if the active BWP of the UE includes two subbands, second half of the first interlace and first half of the second interlace can be assigned to the UE. First half of an interlace and second half of the interlace can be assigned to the UE as one full interlace. When UE is indicated more than two contiguous half interlaces in addition to certain full interlaces, there are at most two half interlaces, one in the first assigned interlace and another in the last assigned interlace.

For 30 kHz subcarrier spacing and 40 or 80 MHz bandwidth, there are 5 interlaces and two or four subbands, i.e., 10 or 20 partial interlaces. Based on similar calculation indicated above, 6 or 8 bits in UL grant can be used to indicate the assigned contiguous partial interlaces. To meet the regulatory requirements for occupied channel bandwidth, for one UE, at least two or four contiguous partial interlaces which span all the two or four subbands of the UE's active BWP should be assigned.

In other preferred embodiment, the resource unit could be configured by RRC signaling, e.g., ½ or ⅓ or ¼ or ⅕ or ⅙ interlace or other fraction of one interlace is configured as the resource unit. The total number of partial interlaces is equal to the number of full interlaces divided the partial interlace unit size. A new field is introduced in UL grant for indicating the assigned contiguous resource units, To meet the regulatory requirements for occupied channel bandwidth, for one LIE, the assigned contiguous resource units should span across the subbands of the UE's active MVP, otherwise, UE regards it as error case.

In another preferred embodiment, the full interlace and the potential partial interlace are separately indicated to one UE.

As indicated above, the full interlace allocation can be indicated with additional partial interlace. A new field is introduced in UL grant to indicate the partial interlaces to the UE. The partial interlaces may be contiguous partial interlaces, therefore, according to the sizes of the SCS and bandwidth, different number of bits are needed in UL grant to indicate the assigned contiguous partial interlace.

In another preferred embodiment, the full interlace and the potential partial interlace are separately indicated to one UE. A bitmap is introduced in UL grant to indicate the partial interlaces to the UE. Each bit corresponds to a interlace. It may be further configured or preconfigured that only the first partial interlace can be assigned. Thus, a partial interlace may be indicated with the bitmap.

For half interlace indication by the new field, for signaling overhead reduction, in one embodiment, the assigned half interlace is always the second half of the interlace, i.e., the high frequency part of the interlace, the larger PRB numbers of the interlace; in another embodiment, the assigned half interlace is always the first half of the interlace, i.e., the low frequency part of the interlace, the smaller PRB numbers of the interlace.

In another preferred embodiment, the full interlace and the potential partial interlace are separately indicated to one UE. A new field is introduced in UL grant to indicate the number and location of the partial interlaces to the UE by indicating one of the predefined interlace patterns. The predefined interlace patterns can include the examples shown in FIGS. 11, 12, 13, 14 and 15.

In another preferred embodiment, the full interlace and the potential partial interlace are separately indicated to one UE. In a first embodiment, when the UL grant indicates the total interlaces, the assigned half interlace indexes are smaller than the assigned full interlaces, i.e., the assigned half interlaces are earlier than the assigned full interlace in the ascending order of interlace index. In a second embodiment, the assigned half interlace indexes are larger than the assigned full interlaces i.e., the assigned half interlaces are later than the assigned full interlace in the ascending order of interlace index. E.g., assuming contiguous interlace 0, 1 and 2 are assigned to a UE and the indicated number of half interlaces is one, then the assigned half interlace is interlace 0 according to the first embodiment and interlace 2 according to the second embodiment.

In another preferred embodiment, a set of allocated Resource block (RB) is indicated to the UE with stepped. RB-based resource allocation for DL or UL transmission.

The indexes of the set of allocated RBs include:

$$\{RB_{start}, RB_{start}+N_{step}, \ldots, RB_{start}+i*N_{step}, \ldots, RB_{start}+(L-1)*N_{step}\}$$

where $N_{step}$ is the step value, i.e., the distance between any two contiguously allocated RBs in unit of RBs;

$RB_{start}$ is the index of the first allocated RB, $RB_{start}=0, 1, 2, \ldots, N-(L-1)*N_{step}-1$, where N is the total number of RBs of the carrier; and L is the total number of the allocated RBs; and $i=0, 1, 2, \ldots, L-1$.

Regarding the step value, $N_{step}$, in one embodiment, it may be configured to UE by RRC signaling; in another embodiment, UE can implicitly determine the step value according to the carrier bandwidth.

Regarding the index of the first allocated RB, $RB_{start}$, and the total number of the allocated RBs, L, they can be jointly indicated by RIV; alternatively, they are separately indicated by different fields in the DCI.

In another embodiment, a first indicator in the DCI indicates the total number of allocated RBs, L, is separately indicated by a first indicator in the DCI, and a second indicator in the DCI indicates one of resource allocation patterns, which specifies the indexes of allocated RBs.

Figure 20:
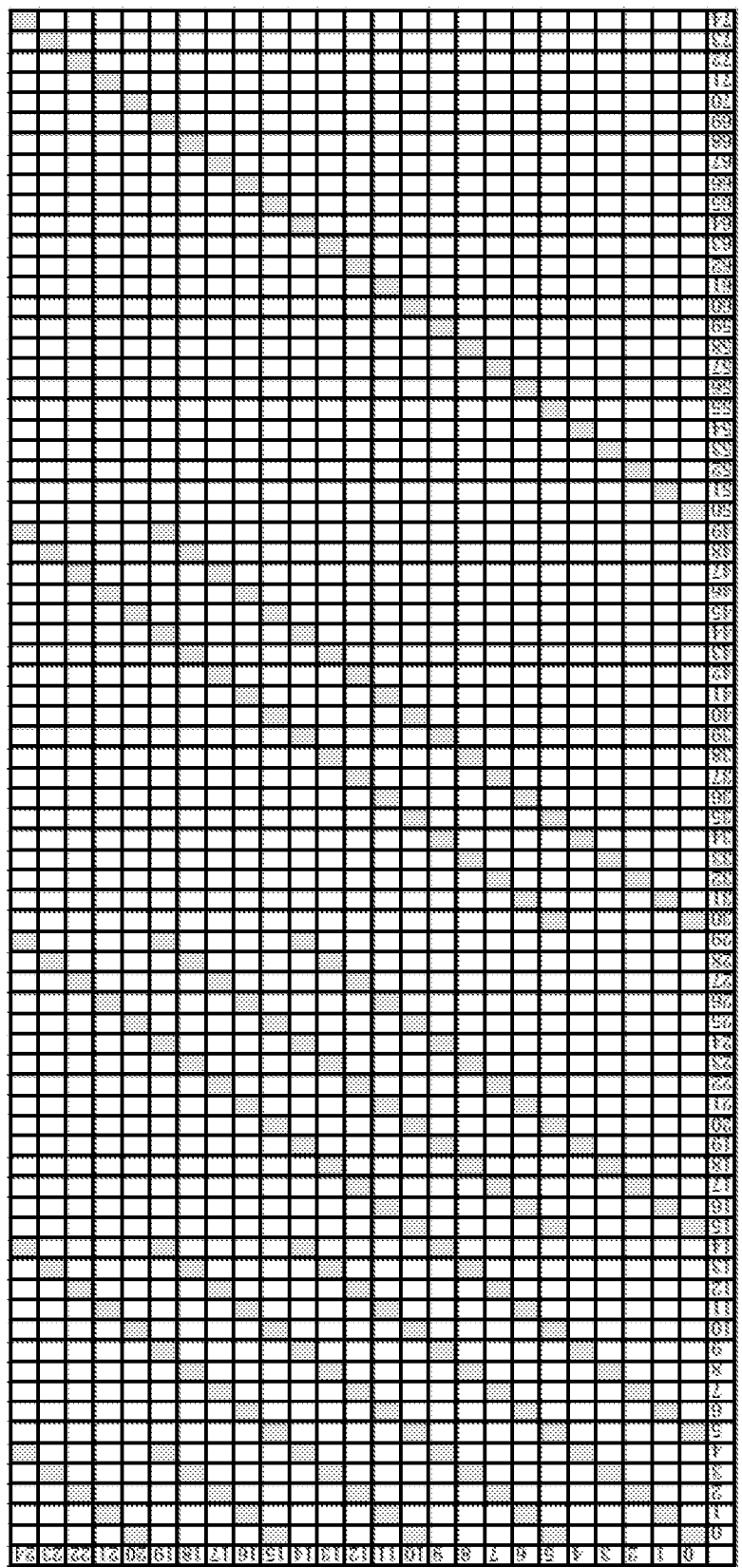
FIG. 20 illustrates an example of 75 resource allocation patterns with step value of 5 RBs.

FIG. 20 illustrates an example of 75 resource allocation patterns with step value of 5 RBs. Assuming that the total number of RBs of the carrier N=25, the step value $N_{step}=5$, there are 75 possible resource allocation patterns.

For the total number of the allocated RBs, L=5, N−(L−1)*$N_{step}$−1=4, namely, index of the first allocated RB, $RB_{start}=0, 1, 2, 3, 4$. Therefore, there are 5 resource allocation patterns:

when $RB_{start}=0$, the allocated RBs include the RBs with the indexes of: $0+i*N_{step}$, i.e., 0, 5, 10, 15, 20, as indicated by line 0 in line 0 in FIG. 20;

when $RB_{start}=1$, the allocated RBs include the RBs with the indexes of: $1+i*N_{step}$, i.e., 1, 6, 11, 16, 21, as indicated by line 1 in line 0 in FIG. 20;

when $RB_{start}=2$, the allocated RBs include the RBs with the indexes of: $2+i*N_{step}$, i.e., 2, 7, 12, 17, 22, as indicated by line 2 in line 0 in FIG. 20;

when $RB_{start}=3$, the allocated RBs include the RBs with the indexes of: $3+i*N_{step}$, i.e., 3, 8, 13, 18, 23, as indicated by line 3 in line 0 in FIG. 20; and when $RB_{start}=4$, the allocated RBs include the RBs with the indexes of: $4+i*N_{step}$, i.e., 4, 9, 14, 19, 24, as indicated by line 4 in line 0 in FIG. 20.

For the total number of the allocated RBs L=4, i=0; 1, 2, 3, $RB_{start}=0, 1, 2, 3, \ldots, 9$, there are 10 resource allocation patterns:

when $RB_{start}=0$, the allocated RBs include the RBs with the indexes of: $0+i*N_{step}$, i.e., 0, 5, 10, 15;

when $RB_{start}=1$, the allocated RBs include the RBs with the indexes of: $1+i*N_{step}$, i.e., 1, 6, 11, 16;

when $RB_{start}=2$, the allocated RBs include the RBs with the indexes of: $2+i*N_{step}$, i.e., 2, 7, 12, 17;

when $RB_{start}=3$, the allocated RBs include the RBs with the indexes of: $3+i*N_{step}$, i.e., 3, 8, 13, 18;

when $RB_{start}=4$, the allocated RBs include the RBs with the indexes of: $4+i*N_{step}$, i.e., 4, 9, 14, 19;

when $RB_{start}=5$, the allocated RBs include the RBs with the indexes of: $5+i*N_{step}$, i.e., 5, 10, 15, 20;

when $RB_{start}=6$, the allocated RBs include the RBs with the indexes of: $6+i*N_{step}$, i.e., 6, 11, 16, 21;

when $RB_{start}=7$, the allocated RBs include the RBs with the indexes of: $7+i*N_{step}$, i.e., 7, 12, 17, 22;

when $RB_{start}=8$, the allocated RBs include the RBs with the indexes of: $8+i*N_{step}$, i.e., 8, 13, 18, 23; and when $RB_{start}=9$, the allocated RBs include the RBs with the indexes of: $9+i*N_{step}$, i.e., 9, 14, 19, 24.

For the total number of the allocated RBs, L=3, i=0, 1, 2, $RB_{start}=0, 1, 2, 3, \ldots, 14$, there are 10 resource allocation patterns:

when $RB_{start}=0$, the allocated RBs include the RBs with the indexes of: $0+i*N_{step}$, i.e., 0, 5, 10;

when $RB_{start}=1$, the allocated RBs include the RBs with the indexes of: $1+i*N_{step}$, i.e., 1, 6, 11;

when $RB_{start}=2$, the allocated RBs include the RBs with the indexes of: $2+i*N_{step}$, i.e., 2, 7, 12;

when $RB_{start}=3$, the allocated RBs include the RBs with the indexes of: $3+i*N_{step}$, i.e., 3, 8, 13;

when $RB_{start}=4$, the allocated RBs include the RBs with the indexes of: $4+i*N_{step}$, i.e., 4, 9, 14;

when $RB_{start}=5$, the allocated RBs include the RBs with the indexes of: $5+i*N_{step}$, i.e., 5, 10, 15;

when $RB_{start}=6$, the allocated RBs include the RBs with the indexes of: $6+i*N_{step}$, i.e., 6, 11, 16;

when $RB_{start}=7$, the allocated RBs include the RBs with the indexes of: $7+i*N_{step}$ i.e., 7, 12, 17;

when $RB_{start}=8$, the allocated RBs include the RBs with the indexes of: $8+i*N_{step}$, i.e., 8, 13, 18;

when $RB_{start}=9$, the allocated RBs include the RBs with the indexes of: $9+i*N_{step}$, i.e., 9, 14, 19;

when $RB_{start}$=10; the allocated RBs include the RBs with the indexes of: $10+i*N_{step}$, i.e., 10, 15, 20;

when $RB_{start}$=11, the allocated RBs include the RBs with the indexes of: $11+i*N_{step}$, i.e., 11, 16, 21;

when $RB_{start}$=12; the allocated RBs include the RBs with the indexes of: $12+i*N_{step}$, i.e., 12, 17, 22;

when $RB_{start}$=13, the allocated RBs include the RBs with the indexes of: $13+i*N_{step}$, i.e., 13, 18, 23; and when $RB_{start}$=14; the allocated RBs include the RBs with the indexes of: $14+i*N_{step}$, i.e., 14, 19, 24.

For the total number of the allocated RBs, L, is 2, i=0, 1, $RB_{start}$=1, 2, 3, . . . , 19, there are 20 resource allocation patterns; regarding the total number of the allocated RBs, L is 1, i=0, $RB_{start}$=0, 1, 2, 3, . . . , 24, there are 25 resource allocation patterns. The indexes in these patterns are calculated in a similar fashion.

Regarding the bits required for indicating the above patterns, in a first embodiment, 7 bits are needed to indicate one of 75 resource allocation patterns.

In the second embodiment, 3 bits are needed to indicate the number of RBs from 1 to 5, i.e., value of L, and 5 bits are needed to indicate the index of the first allocated RB, $RB_{stilt}$ with a value from 1 to maximum 24 according to the value of L. So total 8 bits are needed.

In the third embodiment, 3 bits are needed to indicate the number of RBs from 1 to 5, i.e., value of L, and 5 bits are needed to indicate one of resource allocation patterns according to the value of L. Still total 8 bits are needed.

Figure 21:
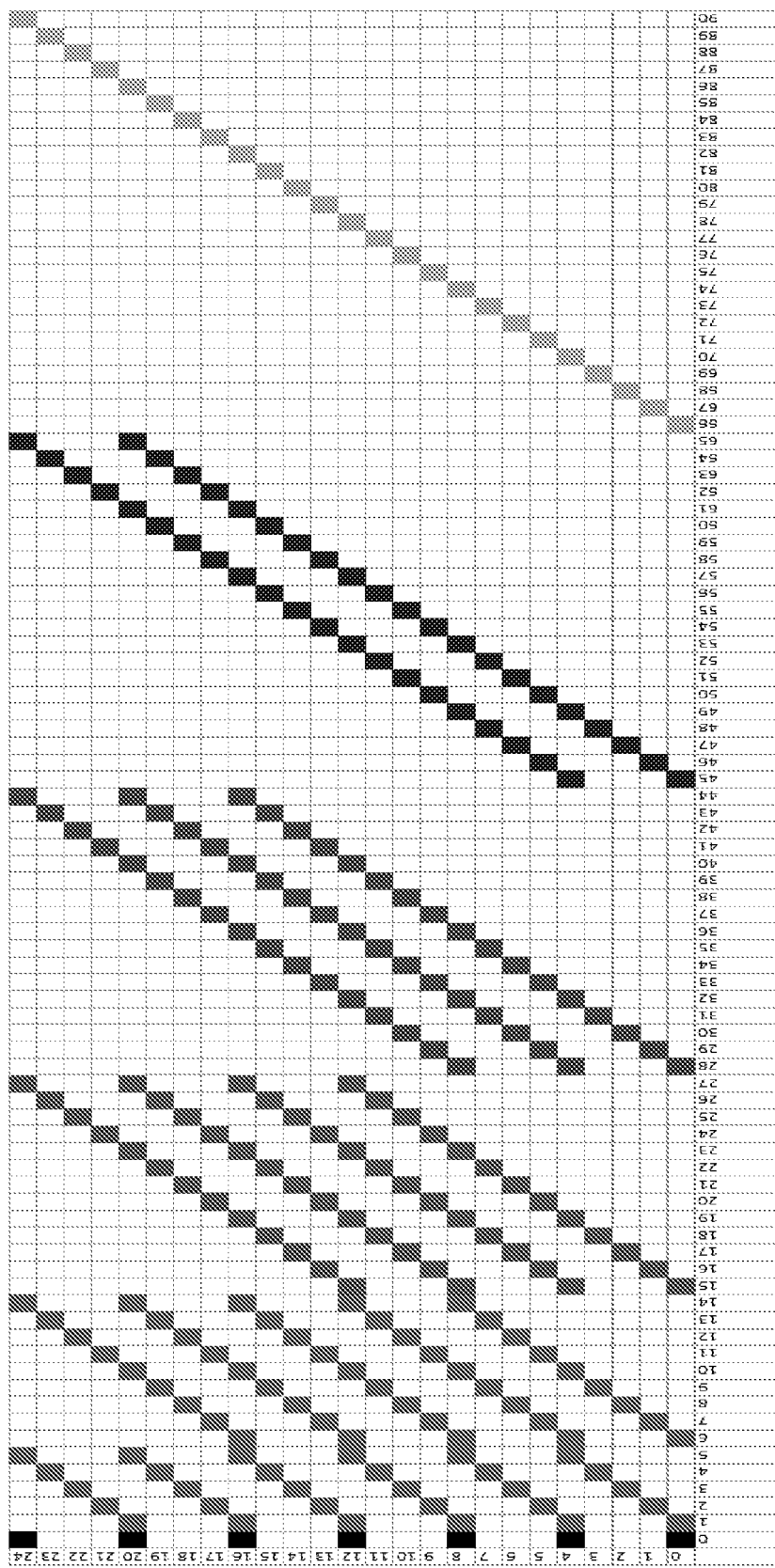
FIG. 21 illustrates an example of 91 resource allocation patterns with step value of 5 RBs.

FIG. 21 illustrates an example of 91 resource allocation patterns with step value of 4 RBs. Assuming that the total number of RBs of the carrier N=25, the step value $N_{step}$=4, there are 91 possible resource allocation patterns:

For the total number of the allocated RBs, L=7, i=0, 1, 2, 3, 4, 5, 6, $RB_{start}$=0, there are 1 resource allocation pattern:

when $RB_{start}$=0, the allocated RBs include the RBs with the indexes of: $0+i*N_{step}$, 0, 4, 8, 12, 16, 20, 24, as shown in line 0 in FIG. 21.

For the total number of the allocated RBs, L=6, i=0, 1, 2, 3, 4, 5, $RB_{start}$=1, 2, 3, 4, there are 5 resource allocation patterns:

when $RB_{start}$=0, the allocated RBs include the RBs with the indexes of: $0+i*N_{step}$, i.e., 0, 4, 8, 12, 16, 20;

when $RB_{start}$=1, the allocated RBs include the RBs with the indexes of: $1+i*N_{step}$, i.e., 1, 5, 9, 13, 17, 21;

when $RB_{start}$=2, the allocated RBs include the RBs with the indexes of: $2+i*N_{step}$, i.e., 2, 6, 10, 14, 18, 22;

when $RB_{start}$=3, the allocated RBs include the RBs with the indexes of: $3+i*N_{step}$, i.e., 3, 7, 11, 15, 19, 23; and when $RB_{start}$=4, the allocated RBs include the RBs with the indexes of: $4+i*N_{step}$, i.e., 4, 8, 12, 16, 20, 24;

For the total number of the allocated RBs, L=5, i=1, 2, 3, 4, $RB_{start}$=0, 1, 2, 8, there are 9 resource allocation patterns:

when $RB_{start}$=0, the allocated RBs include the RBs with the indexes of: $0+i*N_{step}$, i.e., 0, 4, 8, 15, 20, when $RB_{start}$=1, the allocated RBs include the RBs with the indexes of: $1+i*N_{step}$, i.e., 1, 6, 11, 16, 21;

when $RB_{start}$=2, the allocated RBs include the RBs with the indexes of: $2+i*N_{step}$, i.e., 7, 12, 17, 22;

when $RB_{start}$=3, the allocated RBs include the RBs with the indexes of: $3+i*N_{step}$, i.e., 3, 8, 13, 18, 23; and when $RB_{start}$=4, the allocated RBs include the RBs with the indexes of: $4+i*N_{step}$, i.e., 4, 9, 14, 19, 24.

For the total number of the allocated RBs, L=4, i=0, 1, 2; 3, $RB_{start}$=0, 1, 2, 3, . . . , 12, there are 13 resource allocation patterns:

when $RB_{start}$=0, the allocated RBs include the RBs with the indexes of: $0+i*N_{step}$, i.e., 0, 4, 8, 12;

when $RB_{start}$=1, the allocated RBs include the RBs with the indexes of: $1+i*N_{step}$, i.e., 1, 5, 9, 13;

when $RB_{start}$=2, the allocated RBs include the RBs with the indexes of: $2+i*N_{step}$, i.e., 2, 6, 10, 14;

when $RB_{start}$=3, the allocated RBs include the RBs with the indexes of: $3+i*N_{step}$, i.e., 3, 7, 11, 15;

when $RB_{start}$=4, the allocated RBs include the RBs with the indexes of: $4+i*N_{step}$, i.e., 4, 8, 12, 16;

when $RB_{start}$=5, the allocated RBs include the RBs with the indexes of: $5+i*N_{step}$, i.e., 5, 9, 13, 17;

when $RB_{start}$=6, the allocated RBs include the RBs with the indexes of: $6+i*N_{step}$, i.e., 6, 10, 14, 18;

when $RB_{start}$=7, the allocated RBs include the RBs with the indexes of: $7+i*N_{step}$, i.e., 7, 11, 15, 19;

when $RB_{start}$=8, the allocated RBs include the RBs with the indexes of: $8+i*N_{step}$, i.e., 8, 12, 16, 20;

when $RB_{start}$=9, the allocated RBs include the RBs with the indexes of: $9+i*N_{step}$, i.e., 9, 13, 17, 21;

when $RB_{start}$=10, the allocated RBs include the RBs with the indexes of: $10+i*N_{step}$, i.e., 10; 14, 18, 22;

when $RB_{start}$=11, the allocated RBs include the RBs with the indexes of: $11+i*N_{step}$, i.e., 11, 15, 19; 23; and when $RB_{start}$=12, the allocated RBs include the RBs with the indexes of: $12+i*N_{step}$, i.e., 12, 16, 20, 24.

For the total number of the allocated RBs, L=3, i=0, 1, 2, $RB_{start}$=0, 1, 2, 3, . . . , 16, there are 17 resource allocation patterns. For the total number of the allocated RBs, L=2, i=0, 1, $RB_{start}$=0, 1, 2, 3, . . . 20, there are 21 resource allocation patterns. For the total number of the allocated RBs, L=1, i=0, $RB_{start}$=0, 1, 2, 3, . . . , 24, there are 25 resource allocation patterns. The indexes in these patterns are calculated in a similar fashion.

Regarding the bits required for indicating the above patterns, in a first embodiment, 7 bits are needed to indicate one of 75 resource allocation patterns.

In the second embodiment, 3 bits are needed to indicate the number of RBs from 1 to 7, i.e., value of L. and 5 bits are needed to indicate the index of the first allocated RB, $RB_{start}$ with a value from 1 to maximum 24 according to the value of L. So total 8 bits are needed.

In the third embodiment, 3 bits are needed to indicate the number of RBs from 1 to 5, i.e., value of L, and 5 bits are needed to indicate one of resource allocation patterns according to the value of L. Still total 8 bits are needed.

In a preferred embodiment, the LE receives a Downlink Control Information (DCI) from a base station, which assigns frequency resources of a carrier for the UE to transmit data on the carrier, the frequency resources include a first set of PRBs and a second set of PRBs and the frequency resources span over a predefined percentage of a bandwidth of the carrier, for example, 80% of the bandwidth of the carrier, and the bandwidth of the carrier is greater than 20 MHz; and transmits the data on the first set of PRBs and the second set of PRBs. For example, as shown in FIG. 4, the first set of PRBs is represented with the reference number 400-1, and the second set of PRBs is represented with the reference number 400-2. The first set and second set span over the predefined percentage of the bandwidth of the carrier.

The first set of PRBs may comprise one or more full interlaces and the second set of PRBs comprises one or more partial interlaces. For example, in FIG. 10, the first set of PRB includes full interlace 1003, and the second set of PRB includes a half interlace 1004. The full interlace 1003 spans over the predefined percentage of the bandwidth of the carrier, and the full interlace 1003 comprises PRBs that are uniformly spaced within the bandwidth of the carrier. Furthermore, the full interlace 1003 may be indicated by a first indicator in the DCI in unit of full interlace, and a total number of the one or more partial interlaces is indicated by a second indicator in the DCI. The half interlace 1004 is located after the full interlace 1003 in the ascending order of indexes of interlaces. The half interlace located before the full interlace 1003 also can solve the technical problem of the subject disclosure.

In other preferred embodiment, a first indicator in the DCI indicates the partial interlaces and full interlace, and a second indicator in the DCI indicates the total number of the partial interlaces. The partial interlaces may be located before or after the full interlaces in the ascending order of indexes of interlaces.

In other preferred embodiment, a first indicator in the DCI indicates the full interlace in unit of full interlace, and a second indicator in the DCI indicates the partial interlaces in unit of half interlace.

In other preferred embodiment, a first indicator in the DCI indicates the full interlace in unit of full interlace, and a second indicator in the DCI indicates the partial interlaces using a bitmap with each bit corresponding to a partial interlace.

In other preferred embodiment, a first indicator in the DCI indicates the full interlace in unit of full interlace, and a second indicator in the DCI indicates the predefined partial interlace patterns. For example, predefined partial interlace patterns in FIG. 9.

In other preferred embodiment, an indicator in the DCI indicates a predefined interlace pattern, the pattern includes at least one full interlace and at least one partial interlace, thus the full interlaces and the partial interlace is determined. For example, the predefined interlace pattern in FIG. 16 includes at least one full interlace and at least one partial interlace.

In other preferred embodiment, an indicator in the DCI indicates the full interlaces, the partial interlaces in unit of half interlace, in unit of RRC configured fraction of a full interlace, or in unit of subband-based fraction of a full interlace, where the subband-based fraction is one over a total number of subbands in the carrier.

In other preferred embodiment, the first set of PRBs comprises one or more partial interlaces, the second set of PRBs comprises one or more partial interlaces, a partial interlace is a fraction of a full interlace, and a full interlace has a frequency span over the predefined percentage of the bandwidth of the carrier and comprises PRBs that are uniformly spaced within the bandwidth of the carrier. Furthermore; the first set of PRBs and the second set of PRBs have a span across the carrier of the UE.

Figure 22:
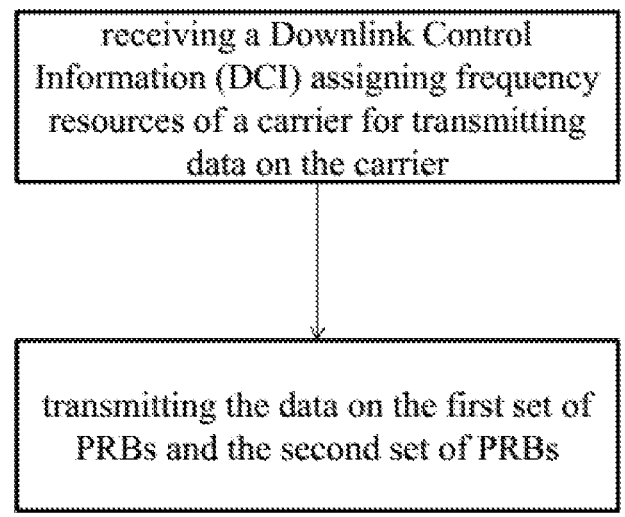
FIG. 22 illustrates a method according to a preferred embodiment of the subject disclosure.
Figure 23:
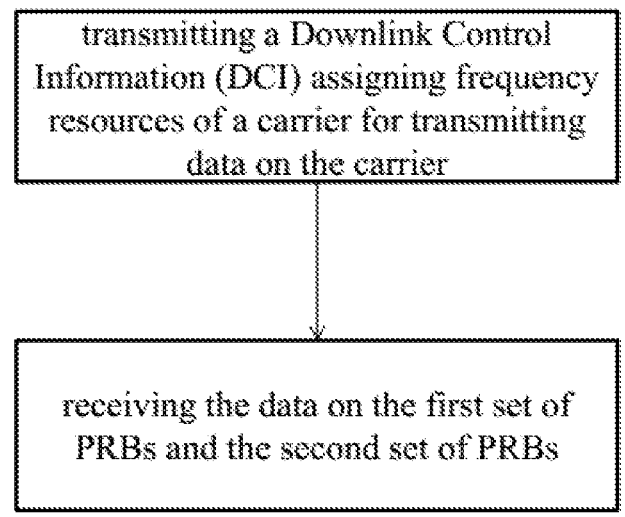
FIG. 23 illustrates a method according to a preferred embodiment of the subject disclosure.

FIG. 22 discloses a method according to a preferred embodiment of the subject disclosure. The method comprises receiving a Downlink Control Information (DCI) assigning frequency resources of a carrier for transmitting data on the carrier, wherein the frequency resources include a first set of Physical Resource Blocks (PRBs) and a second set of PRBs and the frequency resources span over a predefined percentage of a bandwidth of the carrier, and the bandwidth of the carrier is greater than 20 MHz; and transmitting the data on the first set of PR % and the second set of PRBs, FIG. 23 discloses a method according to a preferred embodiment of the subject disclosure. The method comprises transmitting a Downlink Control Information (DCI) to a remote unit for assigning frequency resources of a carrier for transmitting data on the carrier, wherein the frequency resources include a first set of Physical Resource Blocks (PRBs) and a second set of PRBs and the frequency resources span over a predefined percentage of a bandwidth of the carrier, and the bandwidth of the carrier is greater than 20 MHz; and receiving the data from the remote unit on the first set of PRBs and the second set of PRBs.

Figure 24:
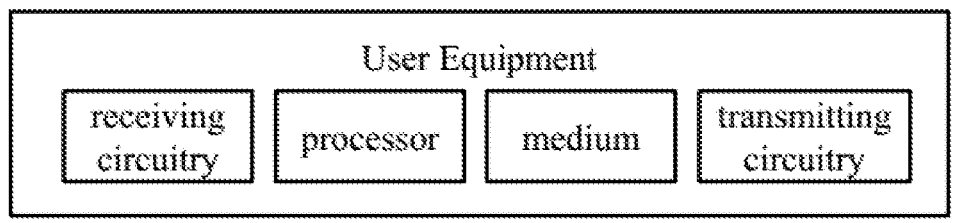
FIG. 24 illustrates a block diagram of a LIE according to the embodiments of the present disclosure.

FIG. 24 depicts a block diagram of a UE according to the embodiments of the present disclosure. The UE 101 may include a receiving circuitry, a processor, and a transmitting circuitry. In one embodiment, the UE 101 may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method with the at least one receiver, the at least one transmitter and the at least one processor. The method according to an embodiment of the present disclosure, for example, is the method shown in FIG. 22.

Figure 25:
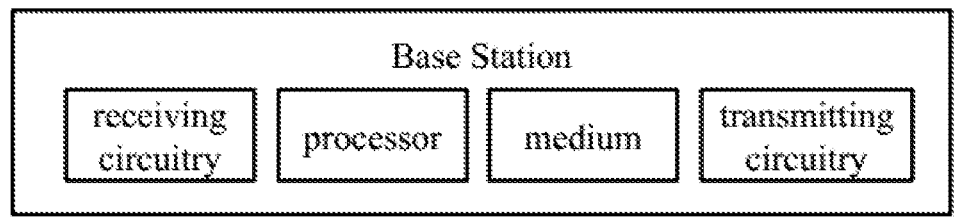
FIG. 25 illustrates a block diagram of a BS according to the embodiments of the present disclosure.

FIG. 25 depicts a block diagram of a BS according to the embodiments of the present disclosure. The BS 102 may include a receiving circuitry; a processor, and a transmitting circuitry. In one embodiment, the BS may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method with the at least one receiver, the at least one transmitter and the at least one processor. The method according to an embodiment of the present disclosure, for example; is the method shown in FIG. 23.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit; a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example; various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion; such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method at a user equipment (UE), the method comprising:
   receiving downlink control information assigning frequency resources of a carrier for transmitting data on the carrier, wherein the frequency resources include a first set of physical resource blocks and a second set of physical resource blocks, the frequency resources span over a predefined percentage of a bandwidth of the carrier, and the bandwidth of the carrier is greater than 20 MHz, and wherein the first set of physical resource blocks, the second set of physical resource blocks, or a combination thereof comprises one or more partial interlaces, a partial interlace is a fraction of a full interlace, and a full interlace has a frequency span over the predefined percentage of the bandwidth of the carrier and comprises physical resource blocks that are uniformly spaced within the bandwidth of the carrier; and
   transmitting the data on the first set of physical resource blocks and the second set of physical resource blocks.

2. The method of claim 1, wherein the first set of physical resource blocks comprises one or more full interlaces and the second set of physical resource blocks comprises one or more partial interlaces.

3. The method of claim 2, wherein the one or more full interlaces are indicated by a first indicator in the downlink control information in unit of full interlace, and a total number of the one or more partial interlaces is indicated by a second indicator in the downlink control information.

4. The method of claim 2, wherein a total number of the one or more partial interlaces and the one or more full interlace is indicated by a first indicator in the downlink control information, and a total number of the one or more partial interlaces is indicated by a second indicator in the downlink control information in unit of half interlace.

5. The method of claim 2, wherein the one or more full interlaces are indicated by a first indicator in the downlink control information in unit of full interlace, and the one or more partial interlaces are indicated by a second indicator in the downlink control information in unit of half interlace.

6. The method of claim 2, wherein the one or more full interlaces are indicated by a first indicator in the downlink control information in unit of full interlace, the one or more partial interlaces are indicated by a second indicator in the downlink control information, and the second indicator indicates one of a plurality of predefined partial interlace patterns or the second indicator comprises a bitmap with each bit corresponding to a partial interlace.

7. The method of claim 2, wherein the one or more full interlaces and the one or more partial interlaces are indicated by an indicator in the downlink control information, the indicator indicates one of a plurality of predefined interlace patterns, and each of the plurality of predefined interlace patterns includes at least one full interlace and at least one partial interlace.

8. The method of claim 2, wherein the one or more full interlaces and the one or more partial interlaces are indicated by an indicator in the downlink control information in unit of half interlace, in unit of radio resource control configured fraction of a full interlace, or in unit of subband-based fraction of a full interlace, wherein the subband-based fraction is one over a total number of subbands in the carrier.

9. The method of claim 1, wherein the first set of physical resource blocks comprises one or more partial interlaces and the second set of physical resource blocks comprises one or more partial interlaces.

10. The method of claim 9, wherein the one or more partial interlaces of the first set of physical resource blocks and the one or more partial interlaces of the second set of physical resource blocks are indicated by an indicator in the downlink control information, the indicator indicates one of a plurality of predefined interlace patterns, and each of the predefined interlace patterns includes at least two partial interlaces with one in the lowest subband of the carrier and the other in the highest subband of the carrier.

11. A method at a base station, the method comprising:
    transmitting downlink control information to a remote unit for assigning frequency resources of a carrier for transmitting data on the carrier, wherein the frequency resources include a first set of physical resource blocks and a second set of physical resource blocks, the frequency resources span over a predefined percentage of a bandwidth of the carrier, and the bandwidth of the carrier is greater than 20 MHz, and wherein the first set of physical resource blocks, the second set of physical resource blocks, or a combination thereof comprises one or more partial interlaces, a partial interlace is a fraction of a full interlace, and a full interlace has a frequency span over the predefined percentage of the bandwidth of the carrier and comprises physical resource blocks that are uniformly spaced within the bandwidth of the carrier; and
    receiving the data from the remote unit on the first set of physical resource blocks and the second set of physical resource blocks.

12. The method of claim 11, wherein the first set of physical resource blocks comprises one or more full interlaces and the second set of physical resource blocks comprises one or more partial interlaces.

13. The method of claim 12, wherein the one or more full interlaces are indicated by a first indicator in the downlink control information in unit of full interlace, and a total number of the one or more partial interlaces is indicated by a second indicator in the downlink control information.

14. The method of claim 12, wherein a total number of the one or more partial interlaces and the one or more partial is indicated by a first indicator in the downlink control information, and a total number of the one or more partial interlaces is indicated by a second indicator in the downlink control information in unit of half interlace.

15. The method of claim 12, wherein the one or more full interlaces are indicated by a first indicator in the downlink control information in unit of full interlace, and the one or more partial interlaces are indicated by a second indicator in the downlink control information in unit of half interlace.

16. The method of claim 12, wherein the one or more full interlaces are indicated by a first indicator in the downlink control information in unit of full interlace, the one or more partial interlaces are indicated by a second indicator in the downlink control information, and the second indicator indicates one of a plurality of predefined partial interlace patterns or the second indicator comprises a bitmap with each bit corresponding to a partial interlace.

17. The method of claim 12, wherein the one or more full interlaces and the one or more partial interlaces are indicated by an indicator in the downlink control information, the indicator indicates one of a plurality of predefined interlace patterns, and each of the plurality of predefined interlace patterns includes at least one full interlace and at least one partial interlace.

18. The method of claim 15, wherein the first set of physical resource blocks comprises one or more partial interlaces and the second set of physical resource blocks comprises one or more partial interlaces.

19. A user equipment (UE), comprising:
at least one memory; and
at least one processor coupled with the at least one memory and configured to cause the UE to:
receive downlink control information assigning frequency resources of a carrier for transmitting data on the carrier, wherein the frequency resources include a first set of physical resource blocks and a second set of physical resource blocks, the frequency resources span over a predefined percentage of a bandwidth of the carrier, and the bandwidth of the carrier is greater than 20 MHz, and wherein the first set of physical resource blocks, the second set of physical resource blocks, or a combination thereof comprises one or more partial interlaces, a partial interlace is a fraction of a full interlace, and a full interlace has a frequency span over the predefined percentage of the bandwidth of the carrier and comprises physical resource blocks that are uniformly spaced within the bandwidth of the carrier; and
transmit the data on the first set of physical resource blocks and the second set of physical resource blocks.

20. A base station, comprising:
at least one memory; and
at least one processor coupled with the at least one memory and configured to cause the base station to:
transmit downlink control information to a remote unit for assigning frequency resources of a carrier for transmitting data on the carrier, wherein the frequency resources include a first set of physical resource blocks and a second set of physical resource blocks, the frequency resources span over a predefined percentage of a bandwidth of the carrier, and the bandwidth of the carrier is greater than 20 MHz, and wherein the first set of physical resource blocks, the second set of physical resource blocks, or a combination thereof comprises one or more partial interlaces, a partial interlace is a fraction of a full interlace, and a full interlace has a frequency span over the predefined percentage of the bandwidth of the carrier and comprises physical resource blocks that are uniformly spaced within the bandwidth of the carrier; and
receive the data from the remote unit on the first set of physical resource blocks and the second set of physical resource blocks.

* * * * *